(12) United States Patent
Boufounos et al.

(10) Patent No.: US 8,768,075 B2
(45) Date of Patent: Jul. 1, 2014

(54) METHOD FOR CODING SIGNALS WITH UNIVERSAL QUANTIZED EMBEDDINGS

(71) Applicant: Mitsubishi Electric Research Laboratories, Inc., Cambridge, MA (US)

(72) Inventors: Petros T Boufounos, Boston, MA (US); Shantanu Rane, Cambridge, MA (US)

(73) Assignee: Mitsubishi Electric Research Laboratories, Inc., Cambridge, MA (US)

(*) Notice: Subject to any disclaimer, the term of this patent is extended or adjusted under 35 U.S.C. 154(b) by 0 days.

(21) Appl. No.: 13/733,517

(22) Filed: Jan. 3, 2013

(65) Prior Publication Data

US 2013/0121405 A1 May 16, 2013

Related U.S. Application Data

(63) Continuation-in-part of application No. 13/525,222, filed on Jun. 15, 2012, and a continuation-in-part of application No. 13/291,384, filed on Nov. 8, 2011.

(51) Int. Cl.
*G06K 9/46* (2006.01)
*G06K 9/00* (2006.01)

(52) U.S. Cl.
USPC .................. 382/232; 382/100; 382/251

(58) Field of Classification Search
None
See application file for complete search history.

(56) References Cited

U.S. PATENT DOCUMENTS

| 7,009,543 B2* | 3/2006 | Melanson ............... 341/143 |
| 8,542,869 B2* | 9/2013 | He et al. ................ 382/100 |
| 2004/0264691 A1* | 12/2004 | Kalker ..................... 380/1 |
| 2013/0028516 A1* | 1/2013 | Warfield et al. ........ 382/173 |

* cited by examiner

*Primary Examiner* — Daniel Mariam
(74) *Attorney, Agent, or Firm* — Dirk Brinkman; Gene Vinokur

(57) ABSTRACT

Distances between data are encoded by performing a random projection, followed by dithering and scaling, with a fixed scaling for all values. The resulting dithered and scaled projection is quantized using a non-monotonic 1-bit quantizer to form a vector of bits representing the signal. The distance between signals can be approximately calculated from the corresponding vectors of bits by computing the hamming distance of the two vectors of bits. The computation is approximately correct up to a specific distance, determined by the scaling, and not beyond that.

14 Claims, 8 Drawing Sheets

METHOD FOR CODING SIGNALS WITH UNIVERSAL QUANTIZED EMBEDDINGS

RELATED APPLICATIONS

This application is a continuation-in-part of U.S. patent application Ser. No. 13/525,222, "Method for Representing Images Using Quantized Embeddings of Scale-Invariant Image Features, filed by Rane et al., on Jun. 15, 2012, and U.S. patent application Ser. No. 13/291,384, "Method for Privacy Preserving Hashing of Signals with Binary Embeddings," filed by Boufounos et al., on Nov. 8, 2011, which is related to U.S. patent application Ser. No. 12/861,923, "Method for Hierarchical Signal Quantization and Hashing," filed by Boufounos on Aug. 24, 2010.

FIELD OF THE INVENTION

This invention relates generally to encoding data, and more particularly to encoding the data with universal quantized embeddings to preserve pairwise distance between the data

BACKGROUND OF THE INVENTION

Signal Comparison and Nearest Neighbor Methods

Comparing signals is one of the most essential and prevalent tasks in signal processing. A large number of applications fundamentally rely on determining the answers to the following two questions: (1) How should the signals be compared? (2) Given a set of signals and a query signal, which signals are the nearest neighbors of the query signal, i.e., which other signals in the database are most similar to the query signal?

Signal comparison is the fundamental building block for the nearest neighbor (NN) search problem, which is defined as follows: Given a set (often referred to as a database) containing signals and a query signal, find the point in the database that is closest to the query signal. The problem can be extended to K-NN, i.e., determining the K nearest neighbors of the query signal. In this context, the signals in question can be images, videos, features extracted from images or videos, or other waveforms. The qualifier closest refers to a distance metric, such as the Euclidean distance or Manhattan distance between pairs of signals. This distance metric captures some notion of similarity between the signals being compared. If two signals are close according to this signal metric, this means the signals are also similar.

Image Retrieval

In a typical image retrieval application, a query image (in the form of data or a signal) is acquired of an unknown object or scene by a client. The query image is compared to images in a database of known objects or scenes stored in a database at a server to determine similar images. As described above, the similarity can be expressed as a distance between features in the unknown and known data. The performance of such applications can be improved significantly by efficient encoding of distances. The search should be quick and computationally efficient, while the transmission should be bandwidth-efficient.

Image descriptors that use a Scale-invariant feature transform (SIFT), speeded up robust feature (SURF), GIST (of an image), and related techniques, enable fast searches using global image characteristics or local image details when bit rate is not an issue. To address communication complexity, several training-based methods are known. However, all those methods require retraining whenever new database entries are added, causing a change in the signal statistics.

In augmented reality (AR) applications, retraining is undesirable. In addition to the complexity of training at the server, retraining repeatedly necessitates updating the client with the retrained parameters. Thus, methods that do not require training are preferable. These include compressed histogram of gradients (CHoG), in which the descriptors are explicitly designed to be compressed using vector quantization and a compact projection, which uses locality sensitive hashing (LSH) on established descriptors.

Rate-Distortion

One aspect of coding theory is concerned deals with optimizing a rate-distortion (R-D) for encoding data, i.e., using the smallest number of bits to encode the data while incurring the least distortion in the data. As used herein data and signals can be used interchangeably.

For example, during image or video encoding, an encoder attempts to reduce the rate for a given visual quality after decoding. Typically, the R-D is determined by an end user of the data, e.g., a viewer.

Randomized Embeddings

An embedding transforms high-dimensional data (or signals) to a lower-dimension such that some aspects of a relative geometry of the data are preserved, e.g., distances in terms of similarity of the data. Because the geometry is preserved, distance computations can be directly performed on the low-dimensional data, often low rate data embeddings, rather than the original high-dimensional data.

FIG. 1 shows example high-dimension L data point u, v, and a distance-preserving embedding function g(d(u, v)) that preserves distance d in the lower dimension log L, where "^" indicates an approximation. As an advantage, the embedding can use a lower transmission rate.

According to the well known Johnson-Lindenstrauss lemma, a small set of high-dimensional data points can be embedded into a low-dimensional Euclidean space such that the distances between the points is approximately preserved, see for example Johnson et al., "Extensions of Lipschitz mappings into a Hilbert space," Conference in Modern Analysis and Probability, Contemporary Mathematics, American Mathematical Society, pp. 189-206, 1982.

As shown in FIG. 2, for Johnson-Lindenstrauss (J-L) embeddings, the function is increasingly linear. For universal quantized, the function is initially approximately linear for relatively small distances, and then quickly flattens for distances greater than a threshold distance $D_0$.

Well known embedding include the J-L embeddings, i.e., $f: S \to \Re^K$ from a finite set of signals $S \subset \Re^N$ to a K-dimensional vector space, such that, given two signals x and y in S, their images satisfy $$(1-\epsilon)\|x-y\|_2^2 \leq \|f(x)-f(y)\|_2^2 \leq (1+\epsilon)\|x-y\|_2^2.$$

In other words, the embeddings preserve Euclidean distances $l_2$ of point clouds within a small error tolerance $\epsilon$.

Johnson and Lindenstrauss demonstrated that the distances as described above exists in a space of dimension $$K = O\left(\frac{1}{\epsilon^2} \log L\right),$$

where L is the number of signals in S, i.e., its cardinality, and $\epsilon$ the desired tolerance in the embedding. Remarkably, K is independent of the dimensionality N of the set of signals.

It is straightforward to determine such embeddings using a linear mapping. In particular, the function $f(x)=Ax$, where A is a K×N matrix whose entries are drawn randomly from specific distributions, is a J-L embedding with overwhelming probability. Commonly used distributions include independent and identically distributed (i.i.d.), Gaussian, i.i.d. Rademacher, or uniform i.i.d.

The J-L embedding typically results in a significant dimensionality reduction. However, dimensionality reduction does not immediately produce rate reduction. First, the embeddings must be quantized for transmission and, if the quantization is not well designed, the accuracy of the embedding decreases.

In particular, the quantized embeddings satisfy $$(1-\epsilon)\|x-y\|-\tau \leq \|f(x)-f(y)\| \leq (1+\epsilon)\|x-y\|+\tau,$$

where $\tau \propto 2^{-B}$ is the quantizer step size, decreasing exponentially with the number of bits used per dimension B, while $\epsilon$ is a function of K which is the dimensionality of the projection, which scales approximately as $1/\sqrt{K}$. In the extreme case of 1-bit quantization, the embedding does not preserve the amplitudes of signals and therefore, the $l_2$ distances, although it does preserve their angle, i.e., their correlation coefficient.

When designing a quantized embedding, the total rate is determined by the dimensionality of the projection and the number of bits used per dimension, i.e., R=KB. At a fixed rate R, as the dimensionality K increases, the accuracy of the embedding before quantization, as reflected in $\epsilon$ is increased. To keep the rate fixed, the number of bits per dimension should also decrease, which decreases the accuracy due to quantization, reflected in $\tau$. At a constant rate, a multibit quantizer outperforms the 1-bit quantizers.

Universal Quantization and Embeddings

Universal scalar quantization, modifies scalar quantization and designs the quantizer to have non-contiguous quantization regions. This approach also relies on a Johnson-Lindenstrauss style projection, followed by scaling, dithering and scalar quantization $$f(x)=Q(\Delta^{-1}(Ax+w)). \quad (1)$$

where A is a random matrix with $\mathcal{N}$ o, $\sigma^2$-distributed, i.i.d. elements, $\Delta^{-1}$ is an element-wise (inverse) scaling factor, w is a dither vector with i.i.d. elements, uniformly distributed in $[0,\Delta]$, and $Q(\cdot)$ a scalar quantizer operating element-wise on its input. The breakthrough feature in that method is the modified scalar quantizer;

As shown in FIG. 3, the method uses a modified scalar quantizer, which is a 1-bit quantizer designed to have non-contiguous quantization intervals. The quantizer can be thought of as a regular uniform quantizer, determining a multi-bit representation of a signal, and preserving only the least significant bit (LSB) of the representation. Thus, scalar values in [2l,2l+1] quantize to 1, and scalar values in [2l+1,2(l+1)), for any integer l, quantize to 0, Because $Q(\cdot)$ is a 1-bit quantizer, that method uses as many bits as the rows of, i.e., K bits, to encode.

As shown in FIG. 4, the modified quantizer enables efficient universal encoding of signals. Furthermore, that quantization method is also an embedding satisfying $$g(\|x-y\|_2)-\tau \leq d_H(f(x),f(y)) \leq g(\|x-y\|_2)+\tau, \quad (2)$$

where $d_H(\cdot,\cdot)$ is the Hamming distance of the embedded signals, and g(d) is the map $$g(d) = \frac{1}{2} - \sum_{i=0}^{+\infty} \frac{e^{-\left(\frac{\pi(2i+1)\sigma d}{\sqrt{2}\Delta}\right)^2}}{(\pi(i+1/2))^2}, \quad (3)$$

which can be bounded using the bounds $$g(d) \geq \frac{1}{2} - \frac{1}{2}e^{-\left(\frac{\pi\sigma d}{\sqrt{2}\Delta}\right)^2}, \ g(d) \leq \frac{1}{2} - \frac{4}{\pi^2}e^{-\left(\frac{\pi\sigma d}{\sqrt{2}\Delta}\right)^2}, \ g(d) \leq \sqrt{\frac{2}{\pi}}\frac{\sigma d}{\Delta}, \quad (4).$$

The map is approximately linear for small d and, becomes a constant ½ exponentially fast for large d, greater than a distance threshold $D_0$. The slopes of the linear section and the distance threshold $D_0$ are determined by the embedding parameters $\Delta$ and A. In other words, the embedding ensures that the Hamming distance of the embedded signals is approximately proportional to the signals' $l_2$ distance, as long as that $l_2$ distance is smaller than $D_0$.

A piecewise linear function with slope $$\sqrt{\frac{2}{\pi}}\frac{\sigma}{\Delta}$$

until $d=D_0$ and slope equal to zero after that is a very good approximation to (3), in addition to being an upper bound.

The additive ambiguity $\tau$ in (2) scales as $\tau \propto 1/\sqrt{K}$, similar to the constant $\epsilon$ in the multiplicative ($1\pm\epsilon$) factor in J-L embeddings. It should be noted, however, that universal embeddings use 1 bit per projection dimension, for a total rate of R=K. The trade-off between B and K under a constant rate R exhibited by quantized J-L embeddings does not exist under the 1-bit universal embeddings. Still, there is a performance trade-off, controlled by the choice of $\Delta$ in (1).

FIGS. 5 and 6 shows experimentally, and provides the intuition on how the embedding behaves for smaller (501) and larger (502) scaling factor $\Delta$ and for higher (FIG. 5) and lower (FIG. 6) bitrates. The figures plots the embedding Hamming distance as a function of the signal distance for randomly generated pairs of signals. The thickness of the curve is quantified by $\tau$, whereas the slope of the upward sloping part is quantified by $\Delta$.

In the related to U.S. patent application Ser. No. 12/861,923, "Method for Hierarchical Signal Quantization and Hashing." we described a method for hierarchically encoding a signal, specifically an image. We formed an inner product of the signal and a hashing vector, and added a dither scalar to the inner product. The result was quantized using a non-monotonic quantization function subject to a sensitivity parameter which changes hierarchically.

In the related U.S. patent application Ser. No. 13/291,384, "Method for Privacy Preserving Hashing of Signals with Binary Embeddings," we also encoded a signal by dithering and scaling random projections of the signal, and using a non-monotonic scalar quantizer to form a hash. In that Application, privacy of the underlying signal was preserved by keeping the scaling, dithering and projections parameters secret.

In the related U.S. patent application Ser. No. 13/525,222, "Method for Representing Images Using Quantized Embeddings of Scale-Invariant Image Features," we encoded a signal, specifically images, by extracting scale-invariant features from the image. The features were projected to a lower dimensional random projection matrix by multiplying the features by a matrix, of random entries. The matrix of random projections is quantized to produce a matrix of quantization indices, which form a query vector for searching a database of images to retrieve metadata related to the image.

SUMMARY OF THE INVENTION

In conventional encoding, the focus is on how to best encode data (or signals) using as the least number of bits for a lowest possible distortion. However, the end user of the signal could be a server, or some other device. In that case, the goal is different. The encoding must be performed in a way that does not destroy information that the server wants to extract from the data, even if the data cannot be completely recovered after the encoding. In these cases it is only desired to extract specific information from the encoded data. Hence, the distortion should be measured on any information extracted from the encoded data.

Therefore, the embodiments of the invention provide a method for encoding data with universal quantized embeddings to preserve pairwise distance between the data. Specifically, the method can be used in image retrieval applications where the data represent images. The method uses randomized embeddings.

In image retrieval application, the universal embedding can achieve up to 25% rate reduction, when compared with the prior art.

More specifically, the invention encodes the distances between data by performing a random projection followed by dithering and scaling, with a fixed scaling flu all values. The resulting dithered and scaled projection is quantized using a non-monotonic 1-bit quantizer to form a vector of bits representing the signal. The distance between signals can be approximately calculated from the corresponding vectors of bits by computing the hamming distance of the two vectors of bits. The computation is approximately correct up to a specific distance, determined by the scaling, and not beyond that.

DETAILED DESCRIPTION OF THE PREFERRED EMBODIMENTS

Figure 7:
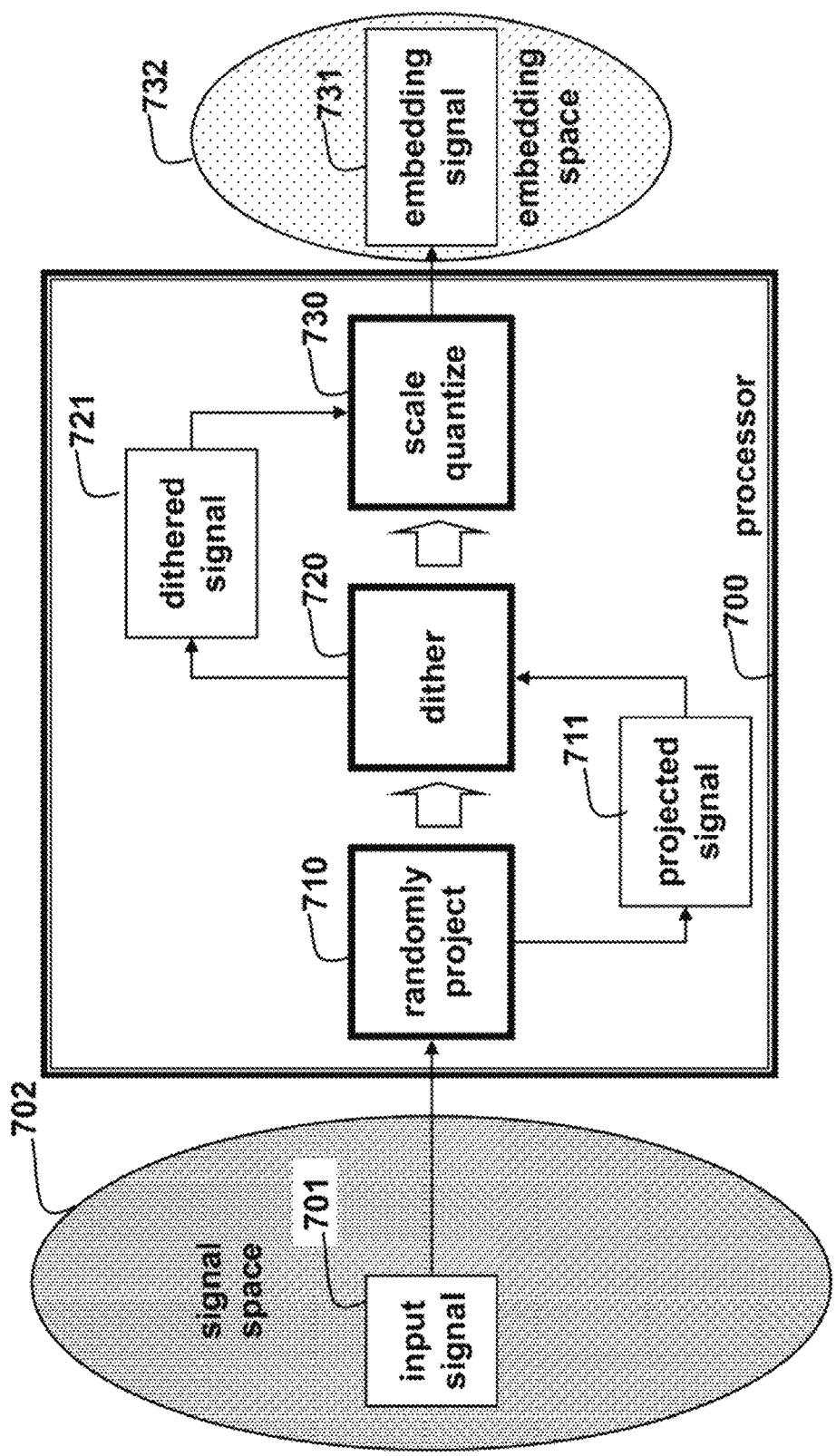
FIG. 7 is a flow diagram of a method for encoding a signal according to embodiments of the invention.

FIG. 7 shows a method for encoding a signal according to embodiment of the invention. The method receives an input signal x 701 in a signal space S 702. The input signal is randomly projected 710 to produce a projected signal 711. The projected signal is dithered 720 to produce a dither signal 721. The dithered signal is scaled and quantized 73 to produce an embedding signal 731 in an embedding space W 732. The quantizer is scalar and non-monotonic. Often, the dimensionality of the signal space is substantially less than that of the embedding space.

The process of dithering, projecting, scaling and quantizing preserves a distance between the input signal and another similarly embedded input signal as long as the distance is less than a predetermined threshold distance. The method can be performed in a processor 700 connected to memory and input/output interfaces as known in the art.

The method and error characteristics of the encoding are described in greater detail below for the general method, and the use of the method in an example image retrieval application.

Error Analysis of Distance Embeddings

To understand ambiguities of our embeddings, we consider a general form of distance guarantees provided by most embeddings. Specifically, we consider the embedding $f: S \rightarrow W$, and distance metrics $d_S(\cdot,\cdot)$ and $d_W(\cdot,\cdot)$ in the signal space and the embedding space, respectively. The embedding for input signals x and y is a $(g,\epsilon,\tau)$ embedding if, for all $\epsilon$, the embedding satisfies $$(1-\epsilon)g(d_S(x,y))-\tau \leq d_W(f(x),f(y)) \leq (1+\epsilon)g(d_S(x,y))+\tau, \quad (5)$$

where $g: \mathfrak{R} \rightarrow \mathfrak{R}$ is an invertible function mapping distances in the signal space S to distances in the embedded space W, and $\epsilon$ and $\tau$ quantify, respectively, the multiplicative and the additive ambiguity of the mapping.

To understand the performance of the embedding during distance computation, we want analyze how well the embedding represents the distance.

The main question is as follows. Given a distance $d_W$ between the two embedded signals in the embedding space W, how confident are we about the corresponding distance between the signals in the signal space S.

The function $g(\cdot)$ expresses how the distance is mapped and can be inverted to approximately determine the distance $d_S$ in the signal space.

The constants $\epsilon$ and $\tau$ express the ambiguity in an opposite direction, i.e., the ambiguity in the embedding space, given the distance in the signal space.

Figure 5:
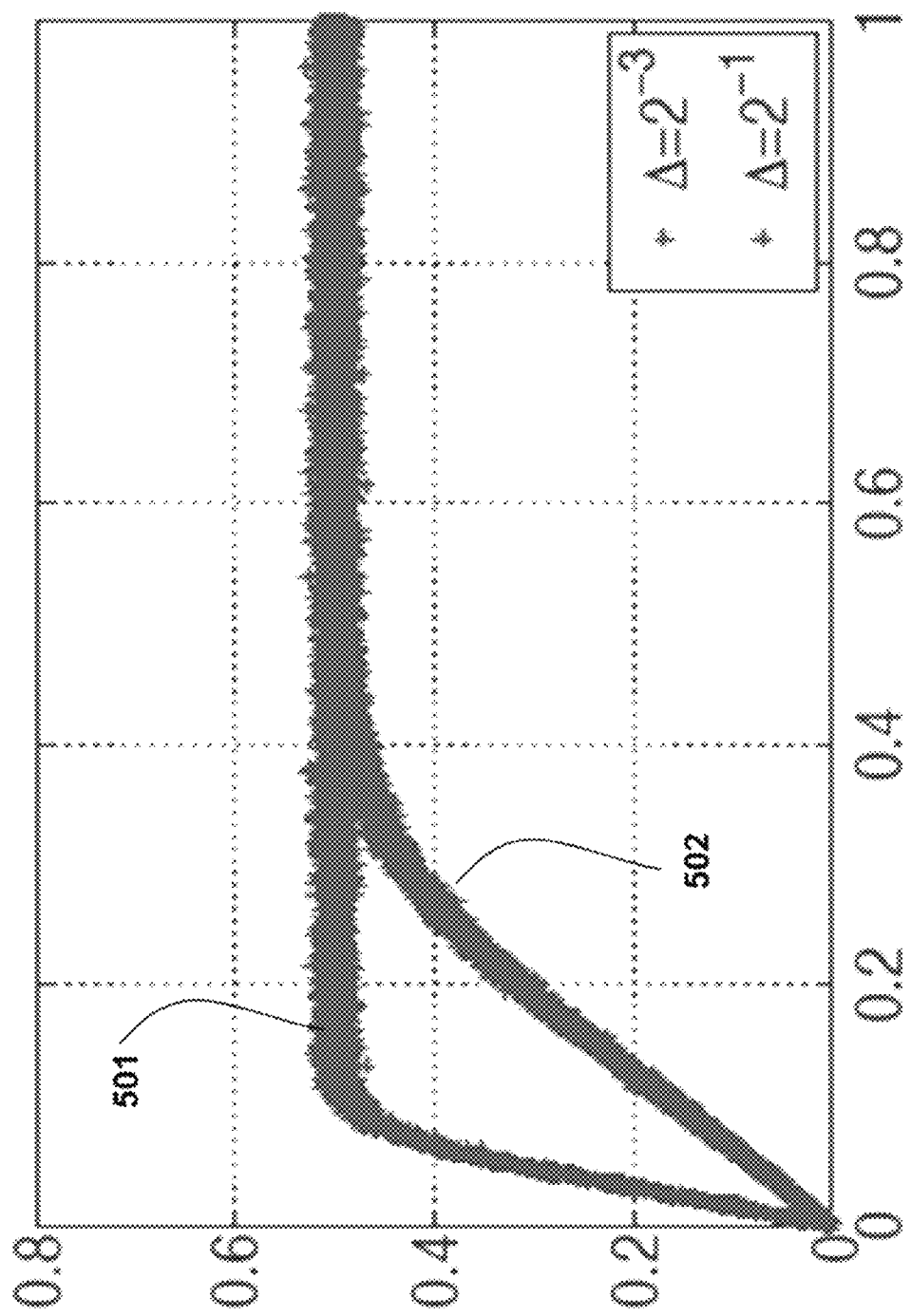
FIG. 5 is a schematic comparing conventional embedding with a small and large scaling factors for low bit rates.
Figure 6:
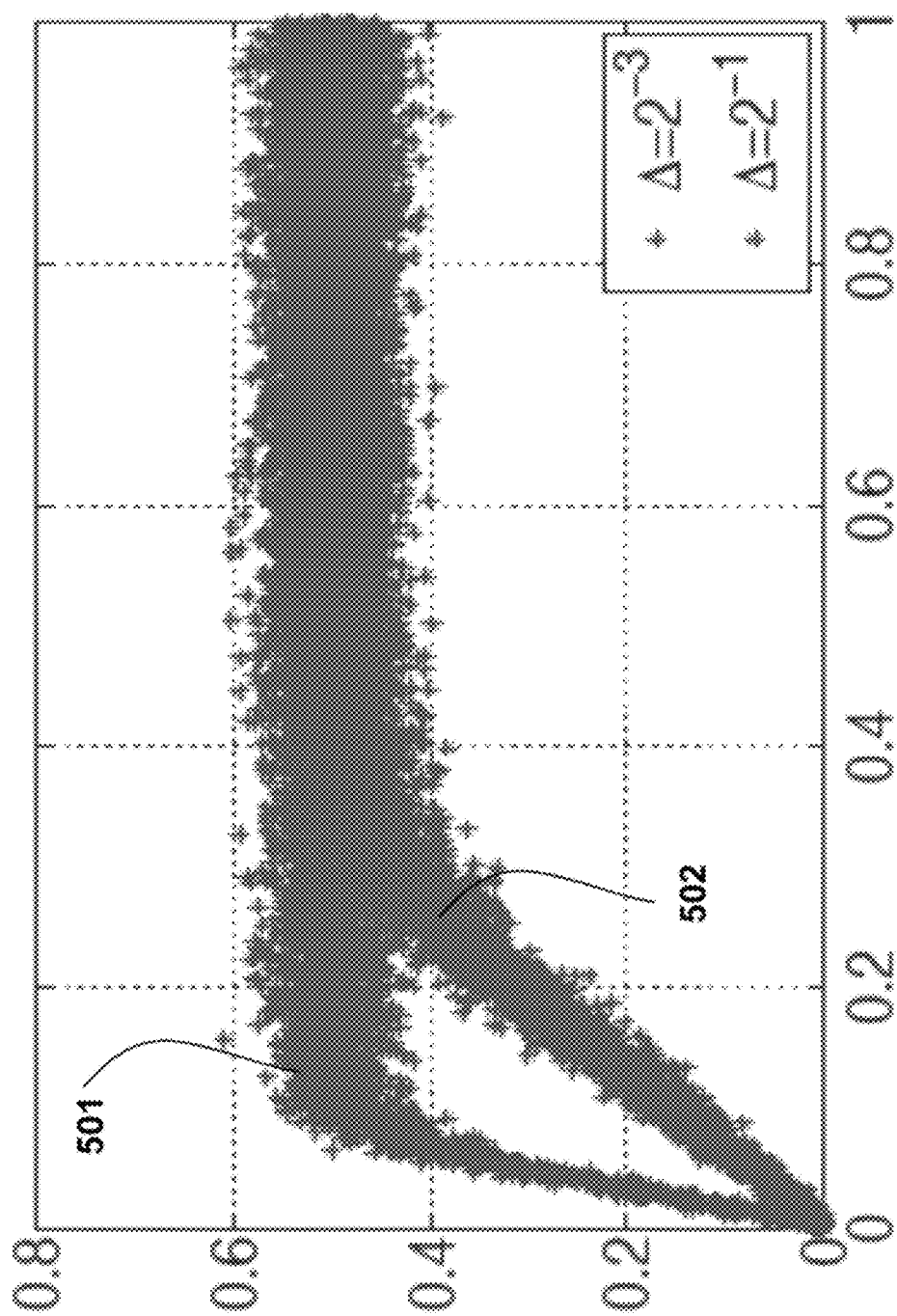
FIG. 6 is a schematic comparing conventional embedding with a small and large scaling factors for high bit rates.

Using the embedding of FIG. 5 as an example, equation (5) characterizes the thickness of the curves taking a vertical slice of the plots. However, we are now interested in the thickness revealed by taking a horizontal slice instead.

To express the desired ambiguity, we can reformulate the embedding guarantees as $$g^{-1}\left(\frac{d_w(f(x), f(y)) - \tau}{(1+\epsilon)}\right) \leq d_s(x, y) \leq g^{-1}\left(\frac{d_w(f(x), f(y)) + \tau}{(1-\epsilon)}\right), \quad (6)$$

which for small $\epsilon$ and $\tau$ can be approximated using the Taylor expansion of $1/(1\pm\epsilon)$:

$$g^{-1}((d_w(f(x),f(y))-\tau)(1-\epsilon))$$

is approximately less than ($\lesssim$)

$$g^{-1}((d_W(f(x),f(y))+\tau)(1+\epsilon)). \quad (7)$$

Assuming that $g(\cdot)$ is differentiable, we can approximate the above inequality using the Taylor expansion of $g^{-1}(\cdot)$ around $d_W(f(x), f(y))$, and the fact that $(g^{-1})'(x)=1/g'(g^{-1}(x))$.

Ignoring the second order term involving $\tau \cdot \epsilon$, and defining the signal distance estimate $$\tilde{d}_S = g^{-1}(d_W(f(x),f(y)))$$

we obtain $$\tilde{d}_s - \frac{\tau + \epsilon d_w(f(x), f(y))}{g'(\tilde{d}_s)}$$

is approximately less than $$d_s(x, y) \lesssim \tilde{d}_s + \frac{\tau + \epsilon d_w(f(x), f(y))}{g'(\tilde{d}_s)}. \quad (8)$$

In other words, given the distance $d_S$ between two signals in the embedding space, and using $\tilde{d}$ to denote the distance estimate in the signal space, the ambiguity is less than $$|d_s(x, y) - \tilde{d}_s| \lesssim \frac{(\tau + \epsilon d_w(f(x), f(y)))}{g'(\tilde{d}_s)}. \qquad (9)$$

Thus, the ambiguity decreases by decreasing $\epsilon$ or $\tau$, or by increasing the slope of the mapping.

Quantized Johnson-Lindenstauss (J-L) Embeddings

In quantized J-L embeddings, $g(d)=d$ and has constant slope of to 1. Thus, the denominator in equation (9) is constant. To reduce the ambiguity, the numerator should be reduced, as much as possible. This requires a trade-off between the size of $\epsilon$ and $\tau$. The value $\epsilon$ is controlled by the dimensionality K of the projection, while the value $\epsilon$ is controlled by the rate per dimension B. As K increases, $\epsilon$ decreases. Similarly, as B increases, $\tau$ decreases.

As we describe above, the total rate of the embedding is R=KB. To best use a given rate, the trade-off is between fewer projection dimensions at more bits per dimension, and more projection dimensions at fewer bits per dimension.

For the example image retrieval application, the best performance is achieved using B=3 or B=4 bits per dimension, and K=R/3 or K=R/4 dimensions, respectively. The performance using the two values is virtually indistinguishable, but at the same time significantly better than prior art 1-bit approaches, using B=1, R=K.

Universal Embeddings

With universal embedding, any information on the signal model in not used for designing the quantizer. This is a significant advantage of randomized sampling methods, such as the J-L embeddings and compressive sensing (CS). In contrast to quantized J-L embeddings, universal embeddings use 1 bit per embedding dimension. Thus, the rate R also determines the dimensionality of the projection, K=R, as well as the constant $\tau$ in the embedding guarantees in equation (2).

Furthermore, there is no multiplicative term in the guarantees, i.e., $\epsilon=0$. Thus, in the ambiguity analysis of equation (9), the numerator is fully determined. That is, the system designer can only control the denominator. However, this does not mean that there are no design choices and trade-offs. Instead, the trade-off in these embedding is in the choice of the scaling parameter $\Delta$ in equation (1).

Figure 1:
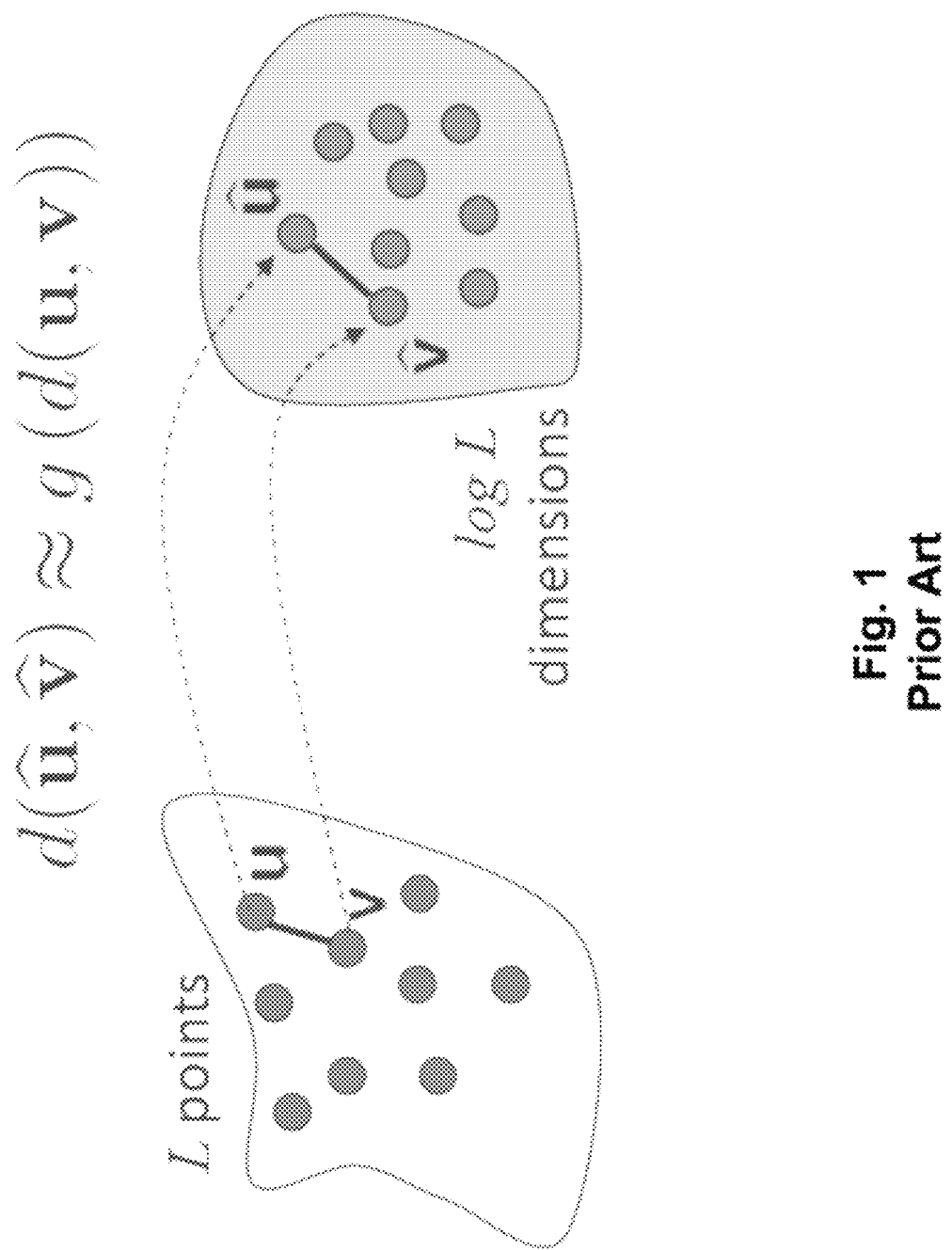
FIG. 1 is a schematic of a conventional embedding of high dimensional data to a lower dimensional space.
Figure 2:
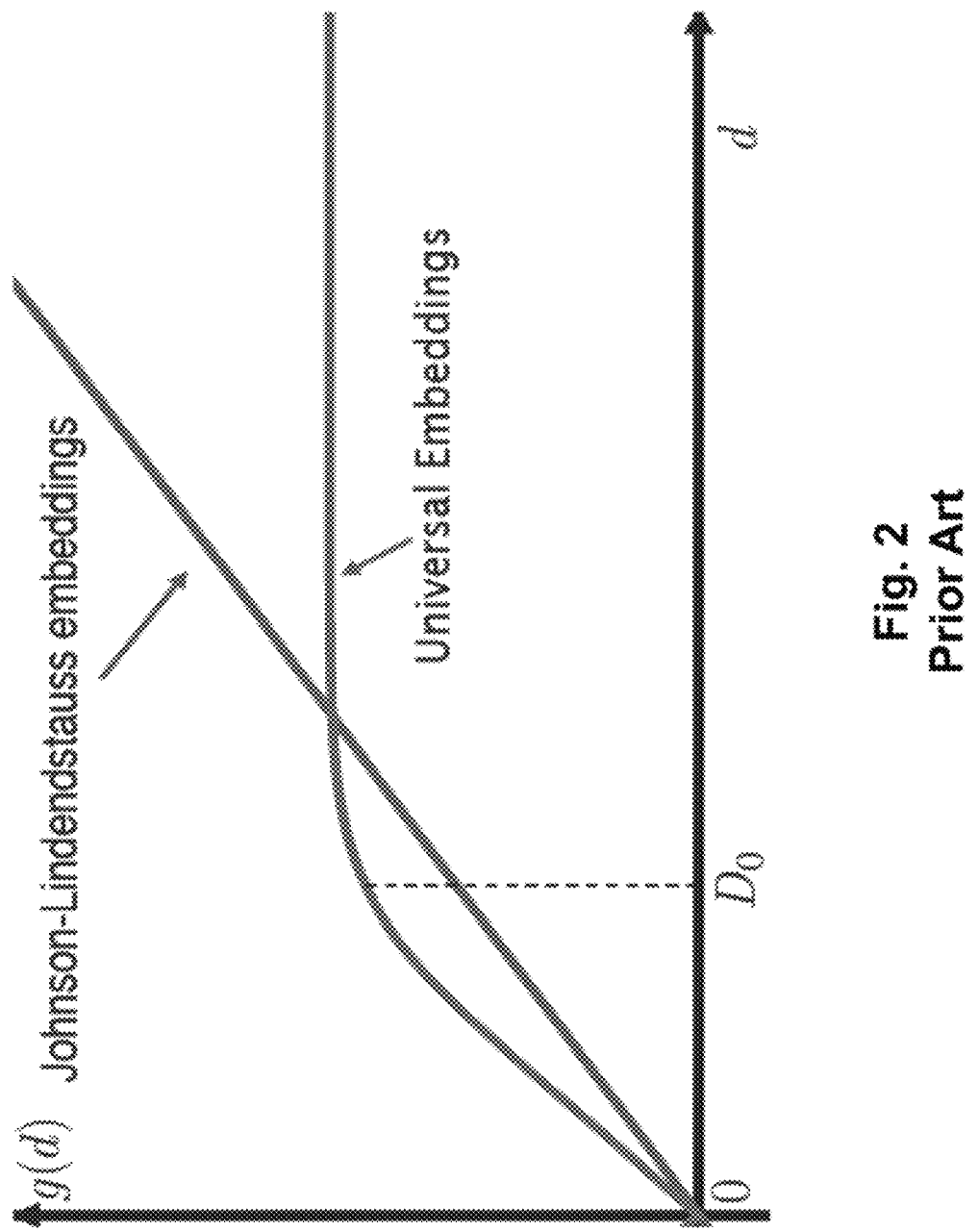
FIG. 2 are graphs comparing conventional Johnson-Lindendslauss and universal scalar embedding.
Figure 3:
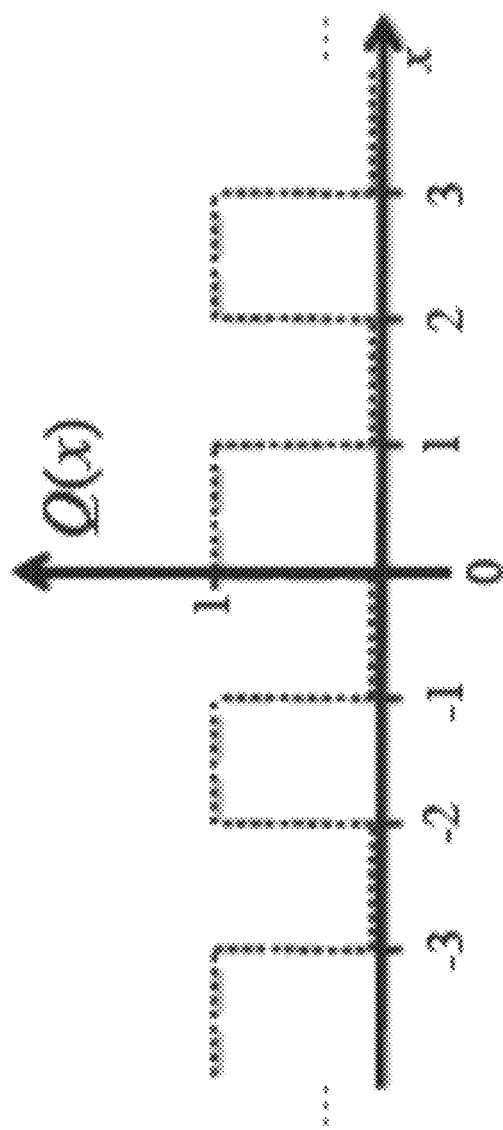
FIG. 3 is a schematic of a conventional non-monotonic quantization function.
Figure 4:
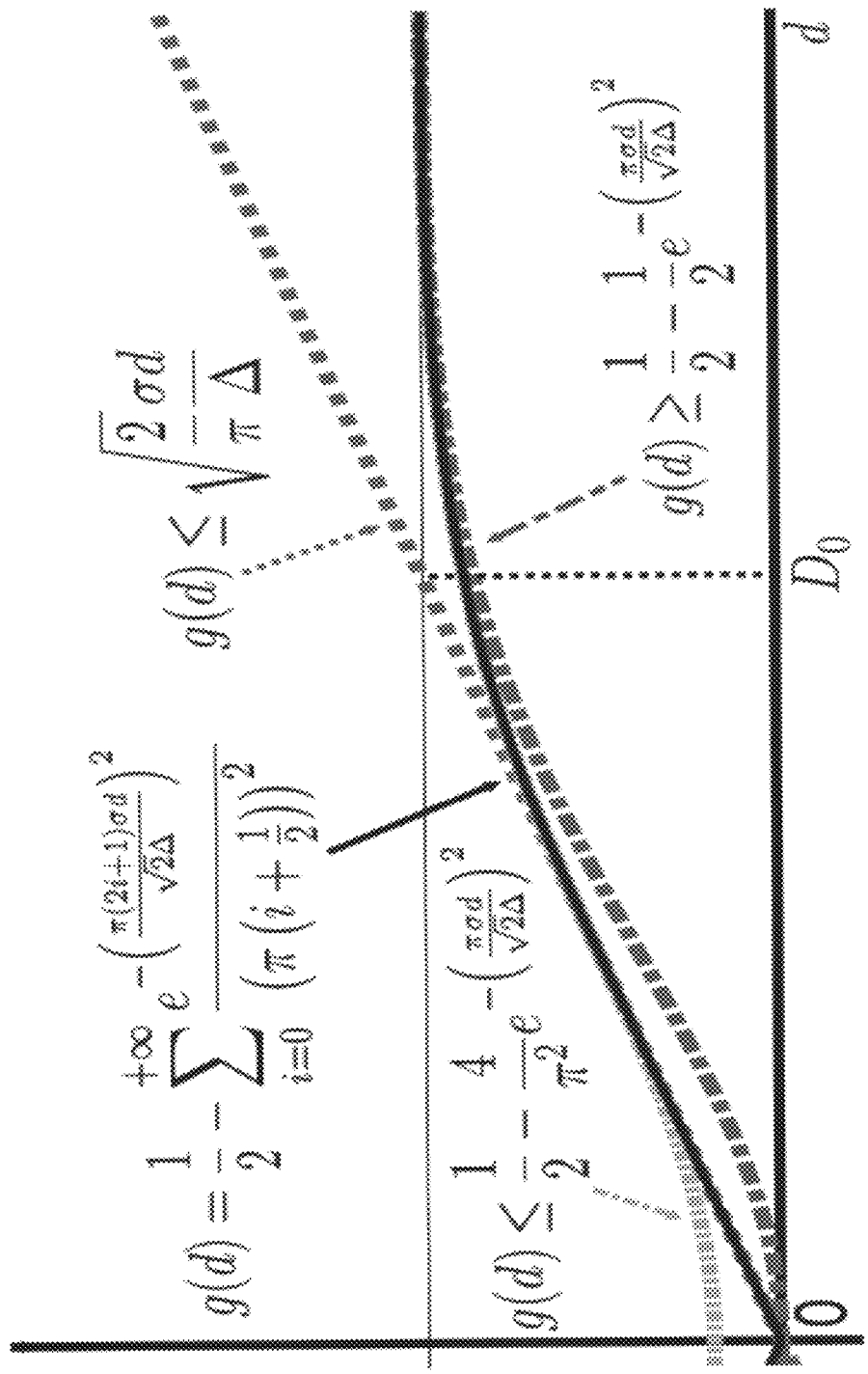
FIG. 4 is a schematic of a conventional embedding map and bounds produced by the quantization function of FIG. 3.

As described above, and shown in FIG. 4, $g(\cdot)$ initially increases approximately linearly, followed by a rapid flattening, and thereafter an approximately flat region. The choice of the scaling factor $\Delta$ controls the slope of the linear region and, therefore, how soon the function reaches the flat region.

As described above, the linear bound in equation (4) is a very good approximation of the increasing linear region of $g(\cdot)$, which has a slope $g'(d) \approx \sqrt{2/\pi}/\Delta$. By decreasing the scaling factor $\Delta$, we can make that slope arbitrarily high, with a corresponding decrease of the ambiguity $\tau/g'(d_g)$. However, this linear region does not extend for all d, but only until d reaches the threshold distance $d=D_0$, where $g(D_0) \approx \frac{1}{2}$, and the flat region of $g(d)$ begins.

As the scaling factor $\Delta$ becomes smaller and the slope of the linear region increases, the flat region is reached much faster, approximately when $D_0\sqrt{2/\pi}/\Delta = \frac{1}{2}$, i.e., when $D_0 \approx \Delta\sqrt{\pi/8} \approx 0.6\Delta$.

Unfortunately, beyond that linear region, the slope $g'(d)$ becomes 0 exponentially fast. This implies that the ambiguity in equation (9) approaches infinity. Thus, if the embedding distance $d_W$ is within $0.5\pm\tau$, then it is impossible to know anything about $d_S$ by inverting the mapping, other than $d_S$ is approximately greater than the threshold distance $D_0$. This makes the trade-off in designing the scaling factor $\Delta$ clear. A smaller $\Delta$ reduces the ambiguity in the range of distances preserved, but also reduces the range of distances preserved. Therefore, the scaling factor $\Delta$ needs to be designed to preserve the distances in the embedding sufficiently for an intended application, e.g., image retrieval.

The example image retrieval application compares a query image provide by a client with nearest-neighbor images stored in a database at a server. When the query image is processed, the embedding distance is determined with respect to all the images in the database, which are embedded using the same parameters as used for the embedding of the query image.

For the query to be successful, there should be at least a small number of entries in the database with a small embedding distance from the query image. These entries are selected and returned to the client. For the query to produce meaningful results, the embedding distance of those entries should accurately represent the signal distance between the query signal and the signals from the entries in the database.

Furthermore, if the signals are all far in distance from the query, the embedding distance should accurately reflect that fact, so that no entry is selected. In this case, the embedding does not need to represent the distance of each entry in the database. In other words, the embedding only needs to represent distances up to the predetermined threshold distance D, and to only identify distances greater than D, without necessarily representing those distances.

Thus, we select the scaling factor $\Delta$ to be as small as possible so the ambiguity in representing distances in the linear region is small, but not smaller than necessary to ensure that all distances of interest stay in the linear region of the embedding, and not in the flat region where the ambiguity is relatively large, i.e., the distances are less than the predetermined threshold distance.

Image Retrieval Using Universal Embeddings

Figure 8:
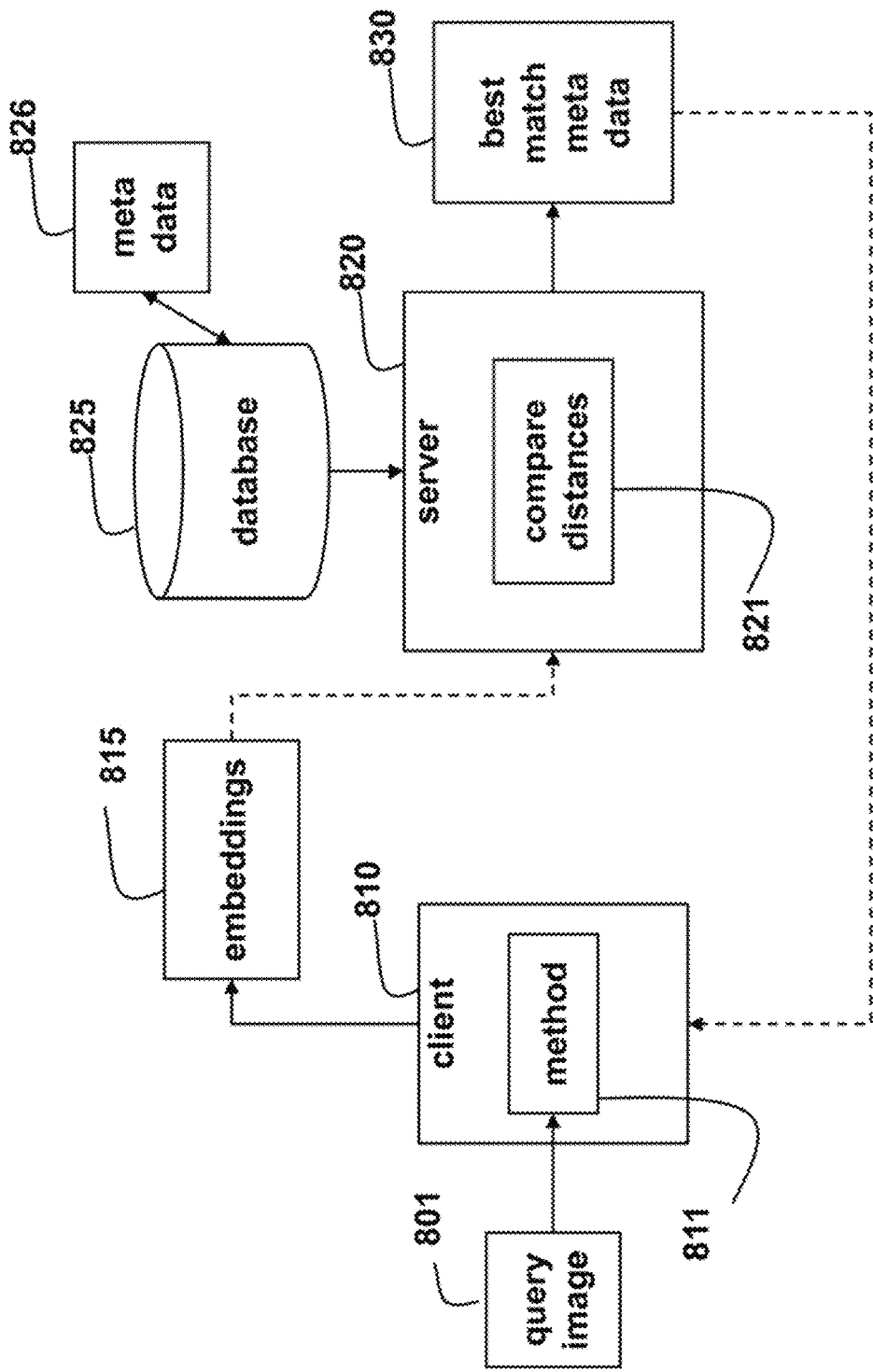
FIG. 8 is a flow diagram of a an image retrieval application using embedding according to the invention.

As shown in FIG. 8, the method 811 as shown in FIG. 7 can be used in the image retrieval application as follows. A user of the client 810 wants to retrieve information about an object in the query image 801. Embedding information 815 about the image is provided to the server 820 connected to the database 825 of images of known objects. Each image is associated with metadata 826 of the object. The server compares 821 the embedding information with similar information about the images in the database to determine the image that best matches the object in the query image using the predetermined distance criterion, and provides the associated metadata 830 of the object to the client. As described herein, these tasks can be effectively accomplished by determining embeddings of features extracted from the query image and the database images. Also, although we describe image retrieval, similar embodiments of the invention can be used to retrieve other kinds of signals such as video, audio, or speech among others.

Database Preparation

In the case of universal embeddings, the server generates the embedding parameters, e.g., the random matrix A, the dither vector w, and the scaling factor $\Delta$ according to the embedding specifications. To construct the database, the server acquires a set of images $I_1, \ldots, I_T$ of S known objects. For each object, the server obtains or generates application-specific metadata $D_S$, $s \in \{1, \ldots, S\}$.

Then, the server extract a set of feature vectors from each image, for example, by applying a scale-invariant feature transform (SIFT) to each image $I_t$. The number of features obtained from each image depends on parameters, such as scene content, illumination, and resolution of a sensor that acquired the image.

The number of feature vectors extracted from all images of all objects is L, and $y_l$ for $l=1, \ldots, L$ denote each feature vector; typically, L>>S. Using the L feature vectors, the server determines the database $\{f(y_1), \ldots, f(y_L)\}$, where each $f(y_i)$ is an R-bit quantized embedding of $y_i$. The server also generates a lookup table A, e.g., $\lambda(l) \subset \{1, \ldots, S\}$, $l=1, \ldots, L$, where each $\lambda(l)$ indexes the object for which the feature vector $f(y_l)$, or equivalently $y_l$ was extracted.

Client Query

It is assumed that the client has access to the embedding parameters used by the server, e.g., from a one-time software update or included as part of a software installation at the client.

After the client acquires the query image, the client generates the set of features $\{x_l, \ldots, x_m\}$, where $x_m$ is a descriptor corresponding to the $m^{th}$ feature in the image. Using these M features and the embedding parameters, the client determines and transmits the corresponding embeddings $\{f(x_1), \ldots, f(x_M)\}$ 825 to the server.

Nearest Neighbor Search and Metadata Retrieval

The server receives $\{f(x_1), \ldots, f(x_M)\}$ from the client. For each feature vector $f(x_m)$, the server determines the nearest neighbor in the server database, i.e., among features $\{f(y_1), \ldots, f(y_L)\}$. The result is M nearest neighbor pairs, one pair for each embedding $f(x_m)$. From the M pairs, the server selects the J pairs $\{f(x_{(j)}), f(y_{(j)})\}$, $j=1, 2, \ldots, J$ that are nearest, in terms of embedding distance, e.g., J=20).

For each of the l pairs, the server uses the lookup table A to determine the index of the object for which feature vector $y_{(j)}$ was extracted. The index is stored in $\alpha_j \in \{1, \ldots, s\}$. The object $s_0$ most common among $\alpha_j$, i.e., the object with the largest number of nearest neighbor matches among the J best matching features, is selected as the response to the query, and the associated metadata 830 is provided to the client 801.

EFFECT OF THE INVENTION

The quantized embeddings used by the encoding method according to embodiments of the invention preserve pairwise distances so that data or signal can be compared. In one application, the data represent images. In a specific application problem to identifying the nearest neighbors, only small distances need to be preserved by the encoding. In this case, universal quantized embeddings outperform quantized Johnson-Lindenstrauss (J-L) embeddings due to unequal preservation of distances in the later.

In particular, universal embeddings accurately preserve distances, up to a known distance, but not greater. Quantized J-L embeddings preserve all distances equally, but not as accurately.

Although the invention has been described by way of examples of preferred embodiments, it is to be understood that various other adaptations and modifications can be made within the spirit and scope of the invention. Therefore, it is the object of the appended claims to cover all such variations and modifications as come within the true spirit and scope of the invention.

We claim:

1. A method for encoding an input signal, comprising the steps of:
    projecting randomly the input signal to produce a projected signal;
    dithering the projected signal to produce a dithered signal;
    scaling the dithered signal to produce a scaled signal;
    quantizing the scaled signal using a non-monotonic scalar quantizer to produce an embedding signal, wherein parameters of the dithering, projecting and quantizing preserve a distance between the input signal and another similarly embedded input signal as long as the distance is less than a predetermined threshold distance, wherein the steps are performed in a processor.

2. The method of claim 1, wherein the input signal is selected from a group consisting of an image, a video, audio, speech and combinations thereof.

3. The method of claim 1, wherein the input signal is selected from a group consisting of features extracted from an image, a video, an audio signal, a speech signal and combinations thereof.

4. The method of claim 1 wherein the embedded signal uses less bits than the input signal.

5. The method of claim 1 wherein the distance between two input signals is determined using a Hamming distance between corresponding embedding signals.

6. The method of claim 1 wherein the scaling used an identical scaling factor for all coefficients of the signal.

7. The method of claim 1 wherein the scaling uses different scaling factors for each coefficient of the signal.

8. The method of claim 1, wherein the embedding signal forms a query vector, and further comprising:
    transmitting the query vector from a client to a server;
    searching a database on the server for similar signals using the query signal; and
    returning relevant data from the server a client.

9. The method of claim 8, wherein the relevant data are metadata of the signal.

10. The method of claim 8, wherein the relevant data are other signals similar to the signal.

11. The method of claim 8, wherein the database contains a set of embedded signals.

12. The method of claim 8, wherein the searching is performed using a nearest neighbor search.

13. The method of claim 8, further comprising:
    using a class of the similar signals to determine a class for the query signal.

14. The method of claim 13, wherein the using comprises the steps of:
    examining the class of similar signals; and
    determining the class of the query signal as the class occurring most in the class of selected signals.

* * * * *